United States Patent [19]

Booher

[11] Patent Number: 4,564,233

[45] Date of Patent: Jan. 14, 1986

[54] FLAT BED TRAILER STRUCTURE

[76] Inventor: Howard Booher, P.O. Box 277, Randolph, Ohio 44265

[21] Appl. No.: 591,928

[22] Filed: Mar. 21, 1984

[51] Int. Cl.⁴ .............................................. B62D 27/06
[52] U.S. Cl. .................................... 296/182; 296/204; 105/347; 105/422; 52/630; 52/667
[58] Field of Search ............... 296/181, 182, 204, 183, 296/209, 29; 403/346, 347; 105/422; 52/630, 667, 664, 785, 819, 821

[56] References Cited

U.S. PATENT DOCUMENTS

| | | | |
|---|---|---|---|
| 3,319,393 | 5/1967 | Tantlinger et al. | 296/182 |
| 3,705,732 | 12/1972 | Marinelli | 296/182 |
| 3,909,059 | 9/1975 | Benninger | 296/182 |
| 4,226,465 | 10/1980 | McCullough | 296/204 |

Primary Examiner—Robert R. Song
Attorney, Agent, or Firm—Harpman & Harpman

[57] ABSTRACT

A flat bed trailer formed of a pair of horizontally spaced longitudinally extending I-beams and a plurality of longitudinally spaced transversely extending tubular members positioned in longitudinally spaced apertures in the I-beams inwardly of their upper portions with the sides of the tubular members being welded to the portions of the I-beams defining the apertures and with the uppermost portions of the tubular members positioned in abutting relation under the upper portions of said I-beams.

9 Claims, 4 Drawing Figures

FLAT BED TRAILER STRUCTURE

BACKGROUND OF THE INVENTION

1. Technical Field

This invention relates to flat bed trailer structures of the type normally employed to transport large heavy articles and palletized groups of smaller heavy articles and coils of flat rolled steel and the like.

2. Description of the Prior Art

Prior flat bed trailer structures of this type usually employ longitudinally extending horizontally spaced main frame members and a plurality of sub-frame members positioned transversely thereof and secured to their uppermost surfaces so as to support a suitable deck. A plurality of reinforcing members are usually positioned between the longitudinally extending frame members and frequently diagonal bracing is provided on the outer sides of the main frame member so as to support the longitudinal edges of the deck.

This invention eliminates the usual cross frame members carried on the longitudinal frame members and the problems associated with maintaining the cross frame members in fixed position thereon and provides an improved structure that is assembled and fastened together by welding with less effort and with a considerable cost and time savings.

SUMMARY OF THE INVENTION

A flat bed trailer structure formed of extruded and/or fabricated aluminum shapes including I-beams and tubular members of generally rectangular cross section are assembled by providing desirably shaped apertures in the web portions of the I-beams in closely spaced relation to their upper transversely disposed portions and positioning the tubular members therethrough and welding oppositely disposed vertical sections of the tubular members to the portions of the web of the I-beams defining the sides of the apertures therein and positioning flooring sections of an overall height the same as that of the horizontal portions of the I-beams on the tubular members together with outside rails secured to the ends of the tubular members and completing the longitudinal edges of the flooring. The flooring members and outside rails being welded to the tubular members to complete the structure.

DESCRIPTION OF THE PREFERRED EMBODIMENT

Figure 1:
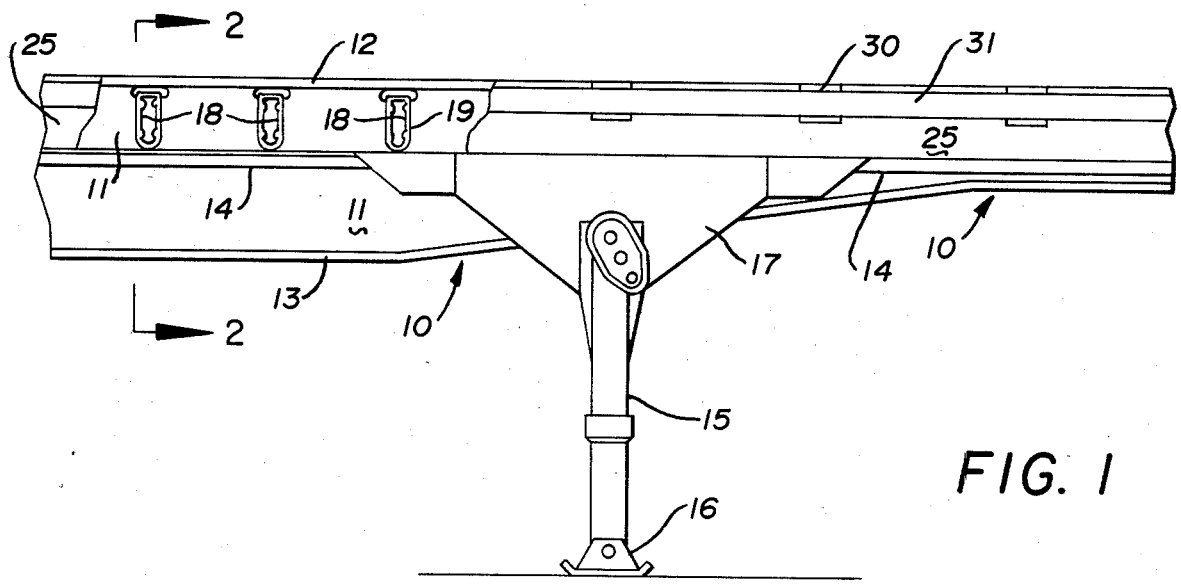
FIG. 1 is a side elevation of a portion of a flat bed trailer with parts broken away and parts in cross section.
Figure 2:
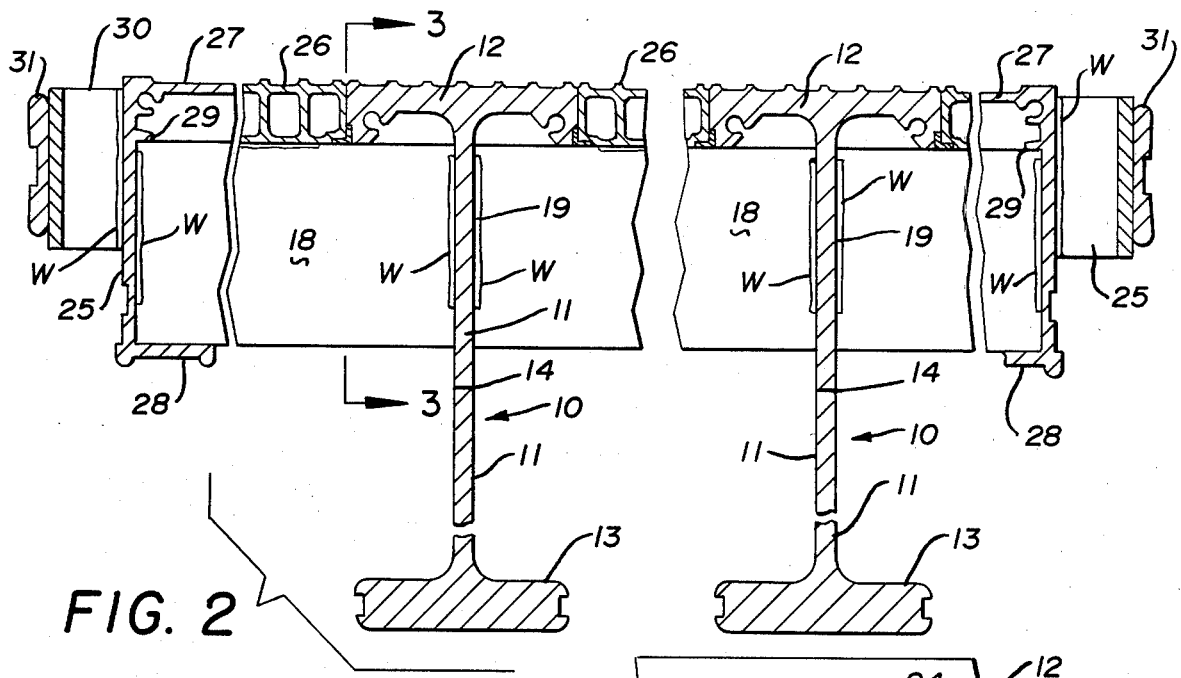
FIG. 2 is a vertical section in enlarged detail on line 2—2 of FIG. 1 with parts broken away and in cross section.

By referring to the drawings and FIG. 1 in particular it will be seen that a flat bed trailer structure is disclosed which is preferably formed of aluminum extruded and fabricated sections and which has a unique low profile and unusual strength and rigidity and resistance to distortion. The portion of the flat bed trailer seen in FIG. 1 comprises a portion inwardly of the front end thereof. The trailer structure is formed of a pair of longitudinally disposed I-beams 10 comprising web portions 11 with upper and lower horizontally disposed flanges or chords 12 and 13 respectively. The I-beams 10 are each formed of a pair of T-shaped extrusions welded to one another longitudinally on a weld line 14. The forward portion of the flat bed trailer has the I-beams 10 of reduced height by forming one of the web portions 11 in a tapered shape below the weld line 14. Air springs, not shown, are positioned in under the rear portion of the flat bed trailer and secured to the longitudinally extending I-beams 10 as will be understood by those skilled in the art and a retractable double leg support 15 having pivoted ground engaging shoes 16 is attached to the forward portion of the flat bed trailer by semi-triangular mounting brackets 17 which are secured to several of a plurality of transversely positioned tubular frame members 18 which are located in longitudinally spaced transversely registering apertures 19 in the upper portions of the webs 11 of the longitudinally extending I-beams 10 as illustrated in FIGS. 1, 2 and 3 of the drawings.

Figure 4:
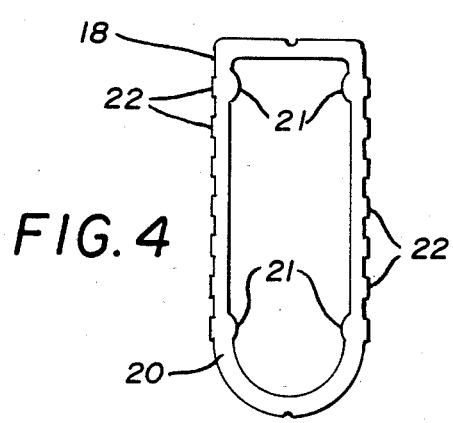
FIG. 4 is an end elevation of one of the members seen in FIGS. 1-3.

An end elevation of one of the transversely positioned tubular frame members 18 is illustrated in FIG. 4 of the drawings, and by referring thereto it will be seen that it is generally rectangular in cross section with straight horizontal top and spaced vertical side walls and has a curved half circular bottom wall 20 which is relatively thicker than the side and top walls. Longitudinally extending thickened areas 21 are formed in oppositely disposed pairs on the inner surfaces of the spaced side walls of the tubular frame member 18 and the outer surfaces of the side walls are provided with longitudinally extending slightly raised ribs 22.

Figure 3:
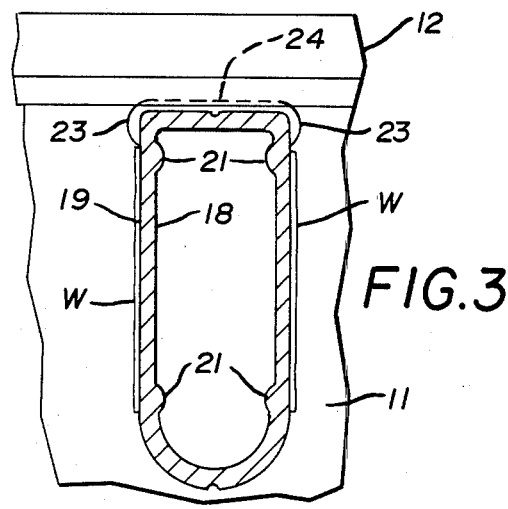
FIG. 3 is a vertical section on line 3—3 of FIG. 2 in enlarged detail with parts broken away and parts in cross section.

By referring to FIG. 3 of the drawings, it will be seen that one of the transversely positioned tubular frame members 18 is shown double welded in position in one of the pairs of transversely registering apertures 19 formed in the upper portions of the webs 11 of the I-beams 10. Each of the opposite spaced vertical side walls of the tubular frame member 18 are welded by fillet welds to the portions of the I-beam web 11 defining the vertical walls of the aperture 19 therein so as to result in double welds joining the side walls of the tubular frame members 18 to the I-beams 10. The lower portion of the aperture 19 is cross sectionally curved in a half circular shape matching that of the bottom portion 20 of the tubular frame members 18 which fit snuggly therein. The upper portion of the aperture 19 as best seen in FIG. 3 of the drawings, is enlarged outwardly at its sides as at 23 and upwardly above the upper straight top portion of the tubular frame member 18 as shown in broken lines and indicated by the numeral 24.

By referring to FIG. 1 of the drawings, it will be seen that three of the tubular frame members 18 are shown double welded as above described in three of the apertures 19, a portion of an outside rail 25 being broken away.

By referring now to FIG. 2 of the drawings, a transverse section, on an enlarged scale, through the flat bed trailer may be seen and by referring thereto one of the transversely positioned tubular frame members 18 will be seen double welded in the apertures 19 in the webs 11 of the I-beams 10. It will also be seen that the upper transversely disposed portions 12 of the I-beams 10 form a portion of the floor of the flat bed trailer. Several longitudinal extending compartmented hollow flooring sections 26 are positioned longitudinally of the flat bed trailer in abutting parallel relation with the upper transversely disposed portions 12 of the I-beams 10. The flooring sections 26 are welded to each of the transversely positioned tubular frame members 18 which support the same.

In a preferred embodiment of the invention, the outside rail 25 has vertically spaced inwardly extending right angular sections 27 and 28 on its upper and lower edges and an inturned flange 29 spaced with respect to the upper flange 27. The ends of each of the transversely positioned tubular frame members 18 abut the inner surface of the outside rails 25 and are welded thereto and the inturned longitudinally extending rib 29 rests on the upper straight top portion of each of the transversely positioned tubular frame members 18 and thereby spaces the inturned flange 27 thereabove on the same level as the upper surfaces of the flooring sections 26 and the upper surfaces of the transversely disposed portions 12 of the I-beams 10.

In a preferred embodiment, space may be left in the flooring between the outermost flooring sections 26 and the downturned innermost edges of the flanges 27 of the outside rails 25 so that wooden members, such as two by fours, can be included in the flooring and secured to the transversely positioned frame members 18 to provide nailer areas in the flooring as will be understood by those skilled in the art.

A plurality of stake pockets 30 are welded to the upper outer portion of the outside rails 25 and a tie rail 31 is welded to the several stake pockets 30. The forward and rearward ends of the flat bed trailer of the invention are provided with front and end rails which match the outside rails 25 and continue the desirable finished appearance to all of the outer edges of the flat bed trailer.

Those skilled in the art will observe that it is desirable that a lengthy flat bed trailer provide a straight flat loading surface as defined by the floor thereof and in the present flat bed trailer structure this is achieved by forming the longitudinally extending horizontally spaced I-beams 10 with a slight upward bow at the time of fabrication thereof so that in the finished flat bed trailer structure they assume a longitudinally flat straight position.

It will be seen that the flat bed trailer structure disclosed herein in its preferred embodiment is formed of aluminum extrusions welded to one another in the finished flat bed trailer assembly and that the spaced longitudinally extending I-beams 10 are fabricated from two such aluminum extrusions, each of which is T-shaped and which extrusions are arranged with one upright and one inverted and joined together by welding them continuously to one another on the weld line 14 hereinbefore referred to. The assembly of the I-beams from the two T-shaped aluminum extrusions enables the plurality of apertures 19 in each of the web portions 11 of the I-beams 10 to be stamped therein rapidly and efficiently with a controlled size and configuration which insures the accurate and desirable positioning of the transversely positioned tubular frame members 18 where they may be easily and efficiently double welded and serve not only to cross brace the I-beams 10, but provide continuous side to side supporting structure for the flooring of the flat bed trailer structure.

A typical flat bed trailer structure formed in accordance with this invention is for example forty two feet from front to rear with the front area thereof of reduced height extending 75 inches inwardly from the front end and the movable dual support 15 being located 130 inches inwardly from the front end and the road engaging support wheels secured to the I-beams 10 arranged on axles engaging the air springs with the axles being located respectively 26 inches and 121 inches respectively from the rear end of the trailer. The typical trailer has an overall width of 95 inches with the webs of the I-beams 10 being spaced 36½ inches from one another. The upper transversely disposed sections 12 of the I-beams 10 are approximately 6 inches wide, each of the flooring sections are approximately 7 inches wide, and the upper inturned flanges 27 of the outside rails 25 are approximately 7 inches wide.

It will thus be seen that a flat bed trailer structure has been disclosed which incorporates novel structural members, extruded and fabricated, and welded in an assembly that produces an exceedingly strong distortion resistant flat bed trailer of relatively light weight and capable of handling the maximum loads permitted on the several interstate highways and the like.

Having thus described my invention, what I claim is:

1. A flat bed trailer structure consisting of a pair of horizontally spaced, longitudinally extending, integral I-beams, each having vertically spaced upper and lower horizontally disposed portions and an intermediate vertically disposed web portion, a plurality of longitudinally spaced, transversely positioned tubular frame members having spaced vertically disposed side walls positioned in transversely registering apertures in said web portion of said I-beams contiguous with said upper horizontally disposed portions of said I-beams, each of said registering apertures defined by spaced vertically positioned sides, longitudinally extending flooring members positioned on the transversely positioned tubular frame members in side by side relation with one another and with said upper horizontally disposed portions of said I-beams, outside rails positioned on the opposite ends of said transversely positioned tubular frame members and welded thereto, said spaced vertically disposed side walls of said tubular frame members welded to said web portions of said I-beams on opposite sides of said apertures therein to form spaced double welds between said tubular frame members and said I-beams, said flooring members and the outside rails welded to said tubular frame members.

2. The flat bed trailer structure of claim 1 and wherein said tubular frame members are substantially rectangular in cross section and positioned in said apertures with their longer portions vertically disposed.

3. The flat bed trailer structure of claim 1 and wherein said tubular frame members are substantially rectangular in cross section and positioned in said apertures with their longer portions vertically disposed, said apertures being of substantially rectangular shape and positioned with their greater length vertically of said web portions of said I-beams.

4. The flat bed trailer structure of claim 1 and wherein said tubular frame members are substantially rectangular in cross section and positioned in said apertures with their longer portions vertically disposed, said apertures being of substantially rectangular shape and positioned with their greater length vertically of said web portions of said I-beams, welds joining the longer portions of said tubular frame members with the portions of the webs defining the greater length of said apertures.

5. The flat bed trailer structure of claim 1 and wherein the upper horizontally disposed portions of said I-beams are of a known thickness and the flooring members are of a matching thickness to form the flat bed of said flat bed trailer structure.

6. The flat bed trailer structure of claim 1 and wherein the upper horizontally disposed portions of said I-beams are of a known thickness and the flooring members are of a matching thickness to form the flat bed of said flat bed trailer structure and wherein said outside rails are of a known height and the flooring members are of a matching thickness so that said outside rails, flooring members and upper horizontally disposed portions of said I-beams form the flat bed of said flat bed trailer structure.

7. The flat bed trailer structure of claim 1 wherein said transversely positioned tubular frame members are substantially rectangular in cross section with spaced side walls and a straight end wall extending therebetween at one of their ends, and an outwardly curved second end wall joining their other ends, the side walls being of a greater length than said straight and curved end walls and positioned in said apertures with said side walls vertical.

8. The flat bed trailer structure of claim 1 wherein said transversely positioned tubular frame members are substantially rectangular in cross section with spaced side walls and a straight end wall extending therebetween at one of their ends, and an outwardly curved second end wall joining their other ends, the side walls being of a greater length than said straight and curved end walls and positioned in said apertures with said side walls vertical and wherein each of said apertures are of substantially rectangular shape having straight side edges and a curved bottom edge and an enlarged upper end forming an edge of said aperture spaced with respect to the straight end wall and the upper portions of said side walls.

9. The flat bed trailer structure of claim 1 wherein said transversely positioned tubular frame members are substantially rectangular in cross section with spaced side walls and a straight end wall extending therebetween at one of their ends, and an outwardly curved second end wall joining their other ends, the side walls being of a greater length than said straight and curved end walls and positioned in said apertures with said side walls vertical and wherein each of said apertures are of substantially rectangular shape having straight side edges and a curved bottom edge and an enlarged upper end forming an edge of said aperture spaced with respect to the straight end wall and the upper portions of said side walls and wherein welds joining said tubular frame members and said webs of said I-beams are between said side walls and said side edges.

* * * * *